United States Patent
Sung et al.

(10) Patent No.: US 12,325,791 B2
(45) Date of Patent: Jun. 10, 2025

(54) THERMOPLASTIC RESIN COMPOSITION

(71) Applicant: LG CHEM, LTD., Seoul (KR)

(72) Inventors: Da Eun Sung, Daejeon (KR); Tae Hoon Kim, Daejeon (KR); Chun Ho Park, Daejeon (KR); Yong Hee An, Daejeon (KR); Wang Rae Joe, Daejeon (KR); Ho Hoon Kim, Daejeon (KR); Jeong Min Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 937 days.

(21) Appl. No.: 17/440,684

(22) PCT Filed: Jan. 27, 2021

(86) PCT No.: PCT/KR2021/001099
§ 371 (c)(1),
(2) Date: Sep. 17, 2021

(87) PCT Pub. No.: WO2021/157945
PCT Pub. Date: Aug. 12, 2021

(65) Prior Publication Data
US 2022/0177692 A1    Jun. 9, 2022

(30) Foreign Application Priority Data

Feb. 3, 2020   (KR) .................. 10-2020-0012607
Jan. 26, 2021  (KR) .................. 10-2021-0010900

(51) Int. Cl.
*C08L 51/04*    (2006.01)

(52) U.S. Cl.
CPC ......... *C08L 51/04* (2013.01); *C08L 2205/025* (2013.01); *C08L 2205/03* (2013.01)

(58) Field of Classification Search
CPC . C08L 51/04; C08L 2205/025; C08L 2205/03
See application file for complete search history.

(56) References Cited

U.S. PATENT DOCUMENTS

| | | | |
|---|---|---|---|
| 5,075,376 A | 12/1991 | Furuta et al. | |
| 5,196,480 A | 3/1993 | Seitz et al. | |
| 6,335,399 B1 * | 1/2002 | Nishimoto | C08L 51/04 525/71 |
| 2006/0148992 A1 | 7/2006 | Kim et al. | |
| 2012/0264882 A1 | 10/2012 | Chu et al. | |
| 2019/0055388 A1 | 2/2019 | Fischer et al. | |
| 2019/0185655 A1 | 6/2019 | Park | |
| 2019/0382574 A1 | 12/2019 | An et al. | |
| 2020/0165439 A1 | 5/2020 | An et al. | |
| 2021/0061984 A1 | 3/2021 | Shin et al. | |
| 2021/0238404 A1 | 8/2021 | Sung et al. | |

FOREIGN PATENT DOCUMENTS

| | | | |
|---|---|---|---|
| CA | 2007393 A1 | 7/1990 | |
| CN | 102686664 A | 9/2012 | |
| CN | 109280311 A | 1/2019 | |
| CN | 110678517 A | 1/2020 | |
| CN | 112074568 A | 12/2020 | |
| EP | 3770214 A1 | 1/2021 | |
| JP | 2012251015 A | 12/2012 | |
| KR | 10-0201985 B | 6/1999 | |
| KR | 10-1999-0049766 A | 7/1999 | |
| KR | 10-2006-0016165 A | 2/2006 | |
| KR | 10-2007-0092884 A | 9/2007 | |
| KR | 10-2010-0002408 A | 1/2010 | |
| KR | 10-2015-0038975 A | 4/2015 | |
| KR | 10-2015-0067478 A | 6/2015 | |
| KR | 10-2015-0072243 A | 6/2015 | |
| KR | 10-2018-0023492 A | 3/2018 | |
| KR | 10-2018-0076637 A | 7/2018 | |
| KR | 10-2019-0082087 A | 7/2019 | |
| KR | 10-2019-0082148 A | 7/2019 | |
| WO | WO-2017055179 A1 * | 4/2017 | .............. C08F 2/002 |

OTHER PUBLICATIONS

Supplementary European Search Report for related Application No. EP 21750464.6, mailed Jul. 11, 2022.
Peixuan Xu, "Design of Plastic Articles", China Light Industry Press, 2001, p. 15.
Wenxin Huang et al., "Synthesis and characterization of size-tunable core-shell structural polyacrylate-graft-poly (acrylonitrile-ran-styrene) (ASA) by pre-emulsion semi-continuous polymerization", European Polymer Journal, 2019, vol. 120, 109247.
He Jian, "Synthesis of Large Particle ASA Latex via Agglomerating Method", Master Degree Thesis, Hefei University of Technology, Apr. 2012.

* cited by examiner

*Primary Examiner* — Angela C Scott

(57) ABSTRACT

Provided is a thermoplastic resin composition which includes: a first graft copolymer including a first acrylic rubber polymer; a second graft copolymer including a second acrylic rubber polymer; and a first styrene-based copolymer including an alkyl-substituted styrene-based monomer unit and an acrylonitrile-based monomer unit, wherein the first acrylic rubber polymer has an average particle diameter larger than that of the second acrylic rubber polymer, the first graft copolymer is included in a larger amount than the second graft copolymer, and the sum of the first graft copolymer and the second graft copolymer is 22 parts by weight or less with respect to 100 parts by weight of the sum of the first graft copolymer, the second graft copolymer, and the first styrene-based copolymer.

12 Claims, No Drawings

THERMOPLASTIC RESIN COMPOSITION

CROSS-REFERENCE TO RELATED APPLICATION

This application is a national phase of International Application No. PCT/KR2021/001099 filed on Jan. 27, 2021, which claims priority to and the benefit of Korean Patent Application No. 10-2020-0012607, filed on Feb. 3, 2020, and Korean Patent Application No. 10-2021-0010900, filed on Jan. 26, 2021, the disclosures of which are incorporated herein by reference in their entirety.

TECHNICAL FIELD

The present invention relates to a thermoplastic resin composition, and particularly, to a thermoplastic resin composition having excellent appearance characteristics.

BACKGROUND ART

In general, graft copolymers including a styrene-based monomer unit and an acrylonitrile-based monomer unit which are grafted onto an acrylic rubber polymer are excellent in terms of weather resistance, staining resistance, and aging resistance. Thermoplastic resin compositions including the graft copolymer are used in various fields such as automobiles, ships, leisure products, building materials, horticultural products, and the like, and the usage thereof is rapidly increasing. Among them, decorative sheets made of the thermoplastic resin composition including the graft copolymer exhibit excellent processing stability compared to decorative sheets made of conventional thermoplastic resin compositions including PVC or PP and do not include heavy metal components, and therefore, they have attracted attention as environmentally friendly materials. However, the decorative sheets have a problem in which pressure marks are left during the storage process or the dimensions of the sheet are deformed (expanded or reduced) during processing. Also, when an adhesive is used for adhesion to the base material, the decorative sheets are melted due to having poor chemical resistance.

Therefore, there is a need to develop a thermoplastic resin composition having improved appearance characteristics.

DISCLOSURE

Technical Problem

The present invention is directed to providing a thermoplastic resin composition that can be used to manufacture a thermoplastic resin molded article having remarkably excellent appearance characteristics due to harmoniously achieving hardness, impact resistance, and heat resistance.

The present invention is also directed to providing a thermoplastic resin composition that can be used to manufacture a thermoplastic resin molded article having excellent weather resistance.

Technical Solution

One aspect of the present invention provides a thermoplastic resin composition which comprises: a first graft copolymer including a first acrylic rubber polymer; a second graft copolymer including a second acrylic rubber polymer; and a first styrene-based copolymer including an alkyl-substituted styrene-based monomer unit and an acrylonitrile-based monomer unit, wherein the first acrylic rubber polymer has an average particle diameter larger than that of the second acrylic rubber polymer, the first graft copolymer is included in a larger amount than the second graft copolymer, and the sum of the first graft copolymer and the second graft copolymer is 22 parts by weight or less with respect to 100 parts by weight of the sum of the first graft copolymer, the second graft copolymer, and the first styrene-based copolymer.

Advantageous Effects

A thermoplastic resin composition according to the present invention can be used to manufacture a thermoplastic resin molded article having remarkably excellent appearance characteristics due to harmoniously achieving hardness, impact resistance, and heat resistance. In addition, the thermoplastic resin composition according to the present invention can be used to manufacture a thermoplastic resin molded article having excellent weather resistance.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

Definition of Terms

As used herein, the term "average particle diameter" may refer to an arithmetic average particle diameter in the particle size distribution as measured by a dynamic light scattering method, specifically, an average particle diameter measured in the scattering intensity distribution. Also, the average particle diameter may be measured by a dynamic light scattering method, specifically, by using a Nicomp 380 instrument (manufacturer: PSS Nicomp).

As used herein, the term "average particle diameter" may be measured by transmission electron microscopy (TEM) analysis. Specifically, the average particle diameter may be calculated as an average value by numerically measuring the size of particles on the high magnification image of TEM. In this case, a specific measurement method is as follows.

Preparation of specimen: graft polymer or thermoplastic resin composition prepared using extrusion kneader Pretreatment of specimen: trimming (23° C.)→hydrazine treatment (72° C., 5 days)→sectioning (−120° C.)→0504 vapor staining (2 hours)

Analysis instrument: TEM (product name: JEM-1400, manufacturer: JEOL USA, Inc.)

Analysis conditions: Acc. Volt 120 kV, SPOT Size 1 (×10,000×25,000×50,000)

Measurement of average particle diameter: the top 10% average particle diameter

As used herein, the term "acrylic rubber polymer" may refer to a polymer formed by crosslinking polymerization of a (meth)acrylate-based monomer and one or more selected from the group consisting of a styrene-based monomer and an acrylonitrile-based monomer. Specifically, the acrylic rubber polymer may be a core formed by crosslinking polymerization of a (meth)acrylate-based monomer and one or more selected from the group consisting of a styrene-based monomer and an acrylonitrile-based monomer to form a seed and then crosslinking polymerization of a (meth)acrylate-based monomer in the presence of the seed.

As used herein, the term "(meth)acrylate-based monomer" may be one or more selected from the group consisting of an acrylate-based monomer and a methacrylate-based monomer. The acrylate-based monomer may refer to one or more selected from the group consisting of methyl acrylate, ethyl acrylate, propyl acrylate, butyl acrylate, pentyl acrylate, hexyl acrylate, heptyl acrylate, octyl acrylate, 2-ethylhexyl acrylate, nonyl acrylate, isononyl acrylate, and decyl acrylate. The methacrylate-based monomer may refer to one or more selected from the group consisting of methyl methacrylate, ethyl methacrylate, propyl methacrylate, butyl methacrylate, pentyl methacrylate, hexyl methacrylate, heptyl methacrylate, octyl methacrylate, 2-ethylhexyl methacrylate, nonyl methacrylate, isononyl methacrylate, and decyl methacrylate. As the (meth)acrylate-based monomer, butyl acrylate is preferred.

As used herein, the term "styrene-based monomer" may encompass both an alkyl-substituted styrene-based monomer and an alkyl-unsubstituted styrene-based monomer. The alkyl-substituted styrene-based monomer may refer to one or more selected from the group consisting of α-methylstyrene, p-methylstyrene, and 2,4-dimethylstyrene. As the alkyl-substituted styrene-based monomer, α-methylstyrene is preferred. The alkyl-unsubstituted styrene-based monomer may refer to one or more selected from the group consisting of styrene, 4-fluorostyrene, 4-chlorostyrene, 2-chlorostyrene, 4-bromostyrene, and 2-bromostyrene. As the alkyl-unsubstituted styrene-based monomer, styrene is preferred.

As used herein, the term "acrylonitrile-based monomer" may be one or more selected from the group consisting of acrylonitrile, methacrylonitrile, ethacrylonitrile, and 2-chloroacrylonitrile. As the acrylonitrile-based monomer, acrylonitrile is preferred.

As used herein, the term "(meth)acrylate-based monomer unit" may be a unit derived from a (meth)acrylate-based monomer.

As used herein, the term "styrene-based monomer unit" may be a unit derived from a styrene-based monomer.

As used herein, the term "alkyl-substituted styrene-based monomer unit" may be a unit derived from an alkyl-substituted styrene-based monomer.

As used herein, the term "alkyl-unsubstituted styrene-based monomer unit" may be a unit derived from an alkyl-unsubstituted styrene-based monomer.

As used herein, the term "acrylonitrile-based monomer unit" may be a unit derived from an acrylonitrile-based monomer.

In the present invention, a weight-average molecular weight may be measured as a relative value with respect to a standard polystyrene (PS) specimen by gel permeation chromatography (GPC, Waters Breeze) using tetrahydrofuran (THF) as an eluent.

Thermoplastic Resin Composition

A thermoplastic resin composition according to an embodiment of the present invention comprises: a first graft copolymer including a first acrylic rubber polymer; a second graft copolymer including a second acrylic rubber polymer; and a first styrene-based copolymer including an alkyl-substituted styrene-based monomer unit and an acrylonitrile-based monomer unit, wherein the first acrylic rubber polymer has an average particle diameter larger than that of the second acrylic rubber polymer, the first graft copolymer is included in a larger amount than the second graft copolymer, and the sum of the first graft copolymer and the second graft copolymer is 22 parts by weight or less with respect to 100 parts by weight of the sum of the first graft copolymer, the second graft copolymer, and the first styrene-based copolymer.

Since the thermoplastic resin composition includes both the first graft copolymer and the second graft copolymer, all of weather resistance, impact resistance, hardness, and surface glossiness may be improved. Specifically, the first graft copolymer may improve the impact resistance and weather resistance of the thermoplastic resin composition by including a first acrylic rubber polymer having a large average particle diameter. The second graft copolymer may improve the hardness, weather resistance, and surface glossiness of the thermoplastic resin composition by including a second acrylic rubber polymer having a small average particle diameter.

The first acrylic rubber polymer has an average particle diameter larger than that of the second acrylic rubber polymer, and the average particle diameter of the first acrylic rubber polymer may be 250 to 500 nm or 300 to 400 nm, with the range of 300 to 400 nm being preferred, as measured by a dynamic light scattering method or transmission electron microscopy (TEM) analysis. Specifically, the average particle diameter thereof may be 300 to 500 nm or 350 to 450 nm, with the range of 350 to 450 nm being preferred, as measured by a dynamic light scattering method. Also, the average particle diameter thereof may be 250 to 450 nm or 300 to 400 nm, with the range of 300 to 400 nm being preferred, as measured by TEM analysis. When the above-described range is satisfied, especially, the impact resistance and weather resistance of the thermoplastic resin composition can be improved.

The second acrylic rubber polymer has an average particle diameter smaller than that of the first acrylic rubber polymer, and the average particle diameter of the second acrylic rubber polymer may be 30 to 200 nm, 60 to 170 nm, or 80 to 130 nm, with the range of 80 to 130 nm being preferred, as measured by a dynamic light scattering method or TEM analysis. Specifically, the average particle diameter thereof may be 50 to 200 nm, 80 to 170 nm, or 90 to 130 nm, with the range of 90 to 130 nm being preferred, as measured by a dynamic light scattering method. Also, the average particle diameter thereof may be 30 to 200 nm, 60 to 170 nm, or 80 to 120 nm, with the range of 80 to 120 nm being preferred, as measured by TEM analysis. When the above-described range is satisfied, especially, the hardness, weather resistance, and surface glossiness of the thermoplastic resin composition can be improved.

The first graft copolymer includes the first acrylic rubber polymer and may specifically include the first acrylic rubber polymer and a styrene-based monomer unit and an acrylonitrile-based monomer unit, both of which are grafted onto the first acrylic rubber polymer. The second graft copolymer includes the second acrylic rubber polymer and may specifically include the second acrylic rubber polymer and a styrene-based monomer unit and an acrylonitrile-based monomer unit, both of which are grafted onto the second acrylic rubber polymer.

The first graft copolymer may be formed by graft polymerization of the first acrylic rubber polymer with a styrene-based monomer and an acrylonitrile-based monomer, and the second graft copolymer may be formed by graft polymerization of the second acrylic rubber polymer with a styrene-based monomer and an acrylonitrile-based monomer.

Meanwhile, since the thermoplastic resin composition includes the first styrene-based copolymer, heat resistance and chemical resistance may be improved, and, especially, heat resistance may be substantially improved. Specifically, the first styrene-based copolymer may improve heat resistance by including an alkyl-substituted styrene-based monomer unit and improve chemical resistance by including an acrylonitrile-based monomer unit. Also, the first styrene-based copolymer particularly improves the heat resistance of the thermoplastic resin composition by producing a synergistic effect with a weight ratio of the first graft copolymer and the second graft copolymer, which is to be described below, and allows hardness, impact resistance, and heat resistance to be harmoniously achieved, and thus a thermoplastic resin molded article having excellent appearance characteristics may be manufactured.

The first styrene-based copolymer may be a non-grafted copolymer and may be selected from the group consisting of an α-methylstyrene/acrylonitrile copolymer and an α-methylstyrene/styrene/acrylonitrile copolymer.

Meanwhile, the thermoplastic resin composition may include the first graft copolymer in an amount larger than that of the second graft copolymer while the sum of the first graft copolymer and the second graft copolymer is 22 parts by weight or less, and preferably, 15 to 22 parts by weight, 21 parts by weight or less, or 15 to 21 parts by weight, with respect to 100 parts by weight of the sum of the first graft copolymer, the second graft copolymer, and the first styrene-based copolymer. When the above-described condition is satisfied, the hardness, impact resistance, and heat resistance of the thermoplastic resin composition are harmoniously achieved, and thus a thermoplastic molded article having remarkably excellent appearance characteristics can be manufactured. When the thermoplastic resin composition includes the first graft copolymer in an amount larger than that of the second graft copolymer while the sum of the first graft copolymer and the second graft copolymer exceeds 22 parts by weight with respect to 100 parts by weight of the sum of the first graft copolymer, the second graft copolymer, and the first styrene-based copolymer, a relatively small amount of the first styrene-based copolymer is included, and thus hardness is substantially degraded. Accordingly, hardness, heat resistance, and impact resistance are not harmoniously achieved, and thus the manufacture of a thermoplastic resin molded article having excellent appearance characteristics is not possible. In addition, when the thermoplastic resin composition includes the first graft copolymer so that the sum of the first graft copolymer and the second copolymer is 22 parts by weight or less with respect to 100 parts by weight of the sum of the first graft copolymer, the second graft copolymer, and the first styrene-based copolymer, but the amount of the first graft copolymer is the same as or smaller than that of the second graft copolymer, impact resistance is degraded, and accordingly hardness, heat resistance, and impact resistance are not harmoniously achieved. As a result, the manufacture of a thermoplastic resin molded article having excellent appearance characteristics is not possible.

The thermoplastic resin composition may include the first graft copolymer and the second graft copolymer in a weight ratio of 10:0.5 to 10:9, 10:0.5 to 10:7, or 10:1 to 10:5, with the weight ratio of 10:1 to 10:5 being preferred. When the above-described condition is satisfied, the hardness and impact resistance of the thermoplastic resin composition are not only excellent but also harmoniously achieved, and thus a thermoplastic molded article having remarkably excellent appearance characteristics can be manufactured.

When the thermoplastic resin composition includes only the first graft copolymer, the second graft copolymer, and the first styrene-based copolymer, the first graft copolymer, the second graft copolymer, and the first styrene-based copolymer may be included so that the sum of the first graft copolymer, the second graft copolymer, and the first styrene-based copolymer is 100 parts by weight.

Meanwhile, the thermoplastic resin composition may further include a second styrene-based copolymer including an alkyl-unsubstituted styrene-based monomer unit and an acrylonitrile-based monomer unit to improve processability.

When the thermoplastic resin composition further includes the second styrene-based copolymer, with respect to 100 parts by weight of the sum of the first graft copolymer, the second graft copolymer, the first styrene-based copolymer, and the second styrene-based copolymer, 5 to 30 parts by weight of the first styrene-based copolymer and 50 to 80 parts by weight of the second styrene-based copolymer may be included, and preferably, 7 to 28 parts by weight of the first styrene-based copolymer and 55 to 75 parts by weight of the second styrene-based copolymer may be included. When the above-described range is satisfied, processability can be improved while maintaining the heat resistance of the thermoplastic resin composition at a specific level or higher.

The second styrene-based copolymer may be a non-grafted copolymer and may be a styrene/acrylonitrile copolymer.

Meanwhile, the thermoplastic resin composition according to the embodiment of the present invention may further include an inorganic pigment to improve weather resistance. The thermoplastic resin composition may include the inorganic pigment in an amount of 0.5 to 18 parts by weight or 1 to 5 parts by weight with respect to 100 parts by weight of the sum of the first graft copolymer, the second graft copolymer, and the first styrene-based copolymer, with the range of 1 to 5 parts by weight being preferred. Also, when the thermoplastic resin composition further includes the second styrene-based copolymer, the inorganic pigment may be included in an amount of 0.5 to 18 parts by weight or 1 to 5 parts by weight with respect to 100 parts by weight of the sum of the first graft copolymer, the second graft copolymer, the first styrene-based copolymer, and the second styrene-based copolymer, with the range of 1 to 5 parts by weight being preferred. When the above-described range is satisfied, not only weather resistance can be improved, but also excellent whitening characteristics can be realized.

The inorganic pigment may be $TiO_2$. As $TiO_2$, commercially available products may be used, and specifically, one or more of TiONA 288 commercially available from Dupont, Ti-Pure R350 commercially available from Chemours Company, and TIOXIDE TR48 commercially available from Venator Materials PLC. may be used.

Meanwhile, the thermoplastic resin composition according to the embodiment of the present invention may further include one or more additives selected from the group consisting of an anti-dripping agent, a flame retardant, an antibacterial agent, an antistatic agent, a stabilizer, a releasing agent, a thermal stabilizer, a UV stabilizer, an inorganic additive, a lubricant, an antioxidant, a photostabilizer, a pigment, a dye, and an inorganic filler.

It is preferable that the thermoplastic resin composition according to the embodiment of the present invention includes one or more selected from the group consisting of a lubricant, an antioxidant, and a UV stabilizer.

A molded article formed of the thermoplastic resin composition according to the embodiment of the present invention may be a sheet, preferably, a decorative sheet for furniture.

Hereinafter, exemplary embodiments of the present invention will be described in detail so that those of ordinary skill in the art can easily carry out the present invention. However, it should be understood that the present invention can be implemented in various forms, and that the exemplary embodiments are not intended to limit the present invention thereto.

Preparation Example 1

<Preparation of Seed>

3 parts by weight of styrene, 3 parts by weight of acrylonitrile, 0.1 parts by weight of sodium dodecyl sulfate as an emulsifier, 0.03 parts by weight of ethylene glycol dimethacrylate as a crosslinking agent, 0.02 parts by weight of allyl methacrylate as a grafting agent, 0.025 parts by weight of KOH as an electrolyte, and 53.32 parts by weight of distilled water were batch-added to a nitrogen-substituted reactor. Afterward, the temperature inside the reactor was raised to 70° C., and 0.03 parts by weight of potassium persulfate as an initiator was batch-added to the reactor to initiate polymerization, and the polymerization was performed for 2 hours and then terminated. As a result, a styrene/acrylonitrile rubber polymer having an average particle diameter of 200 nm, as measured by a dynamic light scattering method, was obtained as a seed.

<Preparation of Core>

Polymerization was performed while continuously adding, to the seed-containing reactor, a mixture including 50 parts by weight of butyl acrylate, 0.6 parts by weight of sodium dodecyl sulfate as an emulsifier, 0.1 parts by weight of ethylene glycol dimethacrylate as a crosslinking agent, 0.04 parts by weight of allyl methacrylate as a grafting agent, 30 parts by weight of distilled water, and 0.05 parts by weight of potassium persulfate as an initiator at 70° C. and a constant rate for 4 hours. After the continuous addition was terminated, polymerization was further performed for another 1 hour. As a result, a butyl acrylate rubber polymer having an average particle diameter of 400 nm, as measured by a dynamic light scattering method, was obtained as a core.

<Preparation of Shell>

35 parts by weight of styrene, 9 parts by weight of acrylonitrile, and 39 parts by weight of distilled water were added to the core-containing reactor. Polymerization was performed while continuously adding, to the reactor, each of a first mixture including 1.9 parts by weight of potassium rosinate as an emulsifier and 0.19 parts by weight of t-butylperoxy ethylhexyl carbonate as an initiator and a second mixture including 0.16 parts by weight of disodium pyrophosphate, 0.24 parts by weight of dextrose, and 0.004 parts by weight of ferrous sulfate as activators at 75° C. and a constant rate for 3 hours. After the continuous addition of the first and second mixtures was terminated, polymerization was further performed in the reactor at 75° C. for another 1 hour. Then, the polymerization was terminated by cooling the reactor to 60° C. As a result, graft copolymer latex was obtained.

<Preparation of Graft Copolymer Powder>

The graft copolymer latex was added to an aqueous calcium chloride solution containing 0.8 parts by weight of calcium chloride, coagulated at 70° C. and atmospheric pressure for 7 minutes, aged at 93° C. for 7 minutes, dehydrated, washed, and then dried with 90° C. hot air for 30 minutes, thereby obtaining graft copolymer powder.

Preparation Example 2

<Preparation of Seed>

6 parts by weight of butyl acrylate, 0.5 parts by weight of sodium dodecyl sulfate as an emulsifier, 0.03 parts by weight of ethylene glycol dimethacrylate as a crosslinking agent, 0.02 parts by weight of allyl methacrylate as a grafting agent, 0.025 parts by weight of KOH as an electrolyte, and 53.32 parts by weight of distilled water were batch-added to a nitrogen-substituted reactor. Afterward, the temperature inside the reactor was raised to 70° C., and then 0.03 parts by weight of potassium persulfate as an initiator was batch-added to initiate polymerization, and the polymerization was performed for 2 hours and then terminated. As a result, a butyl acrylate rubber polymer having an average particle diameter of 54 nm, as measured by a dynamic light scattering method, was obtained as a seed.

<Preparation of Core>

Polymerization was performed while continuously adding, to the seed-containing reactor, a mixture including 43 parts by weight of butyl acrylate, 0.5 parts by weight of sodium dodecyl sulfate as an emulsifier, 0.1 parts by weight of ethylene glycol dimethacrylate as a crosslinking agent, 0.1 parts by weight of allyl methacrylate as a grafting agent, 30 parts by weight of distilled water, and 0.05 parts by weight of potassium persulfate as an initiator at 70° C. and a constant rate for 2.5 hours. After the continuous addition was terminated, polymerization was further performed in the reactor for another 1 hour and then terminated. As a result, a butyl acrylate rubber polymer having an average particle diameter of 101 nm, as measured by a dynamic light scattering method, was obtained as a core.

<Preparation of Shell>

36 parts by weight of styrene, 15 parts by weight of acrylonitrile, and 39 parts by weight of distilled water were added to the core-containing reactor, and polymerization was performed while continuously adding, to the reactor, each of a first mixture including 1.5 parts by weight of potassium rosinate as an emulsifier, 0.1 parts by weight of t-dodecyl mercaptan as a molecular weight controlling agent, and 0.04 parts by weight of t-butylperoxy ethylhexyl carbonate as an initiator and a second mixture including 0.1 parts by weight of disodium pyrophosphate, 0.12 parts by weight of dextrose, and 0.002 parts by weight of ferrous sulfate as activators at 75° C. and a constant rate for 2.5 hours. After the continuous addition of the first and second mixtures was completed, polymerization was further performed in the reactor at 75° C. for another 1 hour and then terminated by cooling the reactor to 60° C. As a result, graft copolymer latex was obtained.

<Preparation of Graft Copolymer Powder>

The graft copolymer latex was added to an aqueous calcium chloride solution containing 0.8 parts by weight of calcium chloride, coagulated at 70° C. and atmospheric pressure for 7 minutes, aged at 93° C. for 7 minutes, dehydrated, washed, and then dried with 90° C. hot air for 30 minutes, thereby obtaining graft copolymer powder.

EXAMPLES AND COMPARATIVE EXAMPLES

Information on components used in Examples and Comparative Examples is as follows.

(A-1) First graft copolymer: The graft copolymer powder prepared in Preparation Example 1 was used.
(A-2) Second graft copolymer: The graft copolymer powder prepared in Preparation Example 2 was used.
(B-1) First styrene-based copolymer: 98UHM commercially available from LG Chem Ltd. (α-methylstyrene/styrene/acrylonitrile copolymer, weight-average molecular weight: 100,000 g/mol) was used.
(B-2) Second styrene-based copolymer: 97HC commercially available from LG Chem Ltd. (styrene/acrylonitrile copolymer, weight-average molecular weight: 170,000 g/mol) was used.
(C) Inorganic pigment: $TiO_2$ was used.
The above-described components were mixed in contents shown in Tables 1 to 5 below and stirred to prepare thermoplastic resin compositions.

Experimental Example 1

Each of the thermoplastic resin compositions of Examples and Comparative Examples was input into a twin-screw extrusion kneader set at 230° C. to prepare a pellet. A physical property of the pellet was evaluated by a method described below, and results thereof are shown in Tables 1 to 5 below.
(1) Melt flow Index (g/10 min): measured in accordance with ASTM D1238 under conditions of 220° C. and 10 kg.

Experimental Example 2

The pellet prepared in Experimental Example 1 was injection-molded to prepare a specimen. Physical properties of the specimen were evaluated by methods described below, and results thereof are shown in Tables 1 to 5 below.
(1) Hardness: measured in accordance with ASTM D785.
(2) IZOD impact strength (kg·cm/cm): measured in accordance with ASTM D256.
(3) Heat deflection temperature (° C.): measured in accordance with ASTM D648.

Experimental Example 3

The pellet prepared in Experimental Example 1 was extruded through a film extruder to form a 0.3-mm film. Physical properties of the film were evaluated by methods described below, and results thereof are shown in Tables 1 to 5 below.
(1) Film appearance: determined by evaluating pressure marks and bumps on the film and trimming (fragments) produced during processing through visual inspection.
x: poor (two or more pressure marks, four or more bumps, and trimming were produced on 10 cm×100 cm film)
Δ: fair (one or less pressure mark, two or three bumps, and no trimming were produced on 10 cm×100 cm film)
○: good (no pressure marks, one or less bump, and no trimming were produced on 10 cm×100 cm film)
⊚: very good (no pressure marks, no bumps, and no trimming were produced on 10 cm×100 cm film)
(2) Weather resistance (ΔE): evaluated under SAE J1960 conditions for 2,000 hours using an accelerated weather resistance testing instrument (Ci4000 Weather-Ometer manufactured by ATLAS, xenon-arc lamp, quartz (inner)/S.Boro (outer) filter, irradiance 0.55 W/m2 at 340 nm). In the following equation, ΔE is an arithmetic average value obtained before and after the accelerated weather resistance test, and values close to 0 indicate better weather resistance.

$$\Delta E = \sqrt{(L'-L_0)^2 + (a'-a_0)^2 + (b'-b_0)^2}$$

In the above equation, L', a', and b' are the L, a, and b values measured in the CIE LAB color coordinate system after irradiating the thermoplastic resin molded article with light under SAE J1960 conditions for 2,000 hours, and $L_0$, $a_0$, and $b_0$ are the L, a, and b values measured in the CIE LAB color coordinate system before the light irradiation.

TABLE 1

| Classification | Example 1 | Example 2 | Example 3 | Example 4 | Example 5 | Example 6 |
|---|---|---|---|---|---|---|
| (A-1) First graft copolymer (parts by weight) | 20 | 19 | 15 | 14 | 13 | 11 |
| (A-2) Second graft copolymer (parts by weight) | 1 | 2 | 6 | 7 | 8 | 10 |
| (B-1) First styrene-based copolymer (parts by weight) | 12 | 12 | 12 | 12 | 12 | 12 |
| (B-2) Second styrene-based copolymer (parts by weight) | 67 | 67 | 67 | 67 | 67 | 67 |
| (C) Inorganic pigment (parts by weight) | 0 | 0 | 0 | 0 | 0 | 0 |
| Weight ratio of first and second graft copolymers | 10:0.5 | about 10:1.05 | 10:4 | 10:5 | about 10:6.2 | about 10:9 |
| Melt flow Index | 10.5 | 10.7 | 11.3 | 11.5 | 11.8 | 12 |
| Hardness | 113.6 | 113.7 | 114 | 114.1 | 114.2 | 114.7 |
| Impact strength | 8 | 7.9 | 7.5 | 7.4 | 7.3 | 7 |

TABLE 1-continued

| Classification | Example 1 | Example 2 | Example 3 | Example 4 | Example 5 | Example 6 |
|---|---|---|---|---|---|---|
| Heat deflection temperature | 88.9 | 89.0 | 89.1 | 89.2 | 89.3 | 89.4 |
| Film appearance | ○ | ○ | ○ | ○ | ○ | ○ |
| Weather resistance (ΔE) | 5.2 | 5.2 | 5 | 5 | 4.8 | 4.6 |

(A-1) First graft copolymer: ASA graft copolymer (average particle diameter of butyl acrylate rubber polymer: 400 nm)
(A-2) Second graft copolymer: ASA graft copolymer (average particle diameter of butyl acrylate rubber polymer: 101 nm)
(B-1) First styrene-based copolymer: 98UHM commercially available from LG Chem Ltd. (α-methylstyrene/styrene/acrylonitrile copolymer, weight-average molecular weight: 100,000 g/mol)
(B-2) Second styrene-based copolymer: 97HC commercially available from LG Chem Ltd. (styrene/acrylonitrile copolymer, weight-average molecular weight: 170,000 g/mol)

TABLE 2

| Classification | Example 6 | Example 7 | Example 8 | Example 9 | Example 10 |
|---|---|---|---|---|---|
| (A-1) First graft copolymer (parts by weight) | 11 | 14 | 14 | 14 | 15 |
| (A-2) Second graft copolymer (parts by weight) | 10 | 7 | 7 | 8 | 7 |
| (B-1) First styrene-based copolymer (parts by weight) | 12 | 15 | 79 | 11 | 11 |
| (B-2) Second styrene-based copolymer (parts by weight) | 67 | 64 | 0 | 67 | 67 |
| (C) Inorganic pigment (parts by weight) | 0 | 0 | 0 | 0 | 0 |
| Weight ratio of first and second graft copolymers | about 10:9 | 10:5 | 10:5 | about 10:5.7 | about 10:4.7 |
| Melt flow Index | 12 | 12 | 11.1 | 11.3 | 11.4 |
| Hardness | 114.7 | 114.0 | 113.3 | 114.0 | 113.8 |
| Impact strength | 7 | 7.5 | 8.1 | 7.5 | 7.7 |
| Heat deflection temperature | 89.4 | 90 | 97.2 | 89.1 | 89.1 |
| Film appearance | ○ | ◎ | ◎ | ○ | ○ |
| Weather resistance (ΔE) | 4.6 | 4.6 | 3.9 | 4.8 | 4.9 |

(A-1) First graft copolymer: ASA graft copolymer (average particle diameter of butyl acrylate rubber polymer: 400 nm)
(A-2) Second graft copolymer: ASA graft copolymer (average particle diameter of butyl acrylate rubber polymer: 101 nm)
(B-1) First styrene-based copolymer: 98UHM commercially available from LG Chem Ltd. (α-methylstyrene/styrene/acrylonitrile copolymer, weight-average molecular weight: 100,000 g/mol)
(B-2) Second styrene-based copolymer: 97HC commercially available from LG Chem Ltd. (styrene/acrylonitrile copolymer, weight-average molecular weight: 170,000 g/mol)

TABLE 3

| Classification | Example 11 | Example 12 | Example 13 |
|---|---|---|---|
| (A-1) First graft copolymer (parts by weight) | 14 | 14 | 14 |
| (A-2) Second graft copolymer (parts by weight) | 7 | 7 | 7 |
| (B-1) First styrene-based copolymer (parts by weight) | 12 | 12 | 79 |
| (B-2) Second styrene-based copolymer (parts by weight) | 67 | 67 | 0 |
| (C) Inorganic pigment (parts by weight) | 1 | 3 | 3 |
| Weight ratio of first and second graft copolymers | 10:5 | 10:5 | 10:5 |
| Melt flow Index | 11.6 | 11.8 | 11.4 |
| Hardness | 114.1 | 114.5 | 113.8 |
| Impact strength | 7.3 | 7.1 | 7.8 |
| Heat deflection temperature | 89.4 | 89.6 | 97.5 |
| Film appearance | ○ | ○ | ◎ |
| Weather resistance (ΔE) | 4.6 | 3.6 | 2.5 |

(A-1) First graft copolymer: ASA graft copolymer (average particle diameter of butyl acrylate rubber polymer: 400 nm)
(A-2) Second graft copolymer: ASA graft copolymer (average particle diameter of butyl acrylate rubber polymer: 101 nm)
(B-1) First styrene-based copolymer: 98UHM commercially available from LG Chem Ltd. (α-methylstyrene/styrene/acrylonitrile copolymer, weight-average molecular weight: 100,000 g/mol)
(B-2) Second styrene-based copolymer: 97HC commercially available from LG Chem Ltd. (styrene/acrylonitrile copolymer, weight-average molecular weight: 170,000 g/mol)

TABLE 4

| Classification | Comparative Example 1 | Comparative Example 2 | Comparative Example 3 | Comparative Example 4 | Comparative Example 5 |
|---|---|---|---|---|---|
| (A-1) First graft copolymer (parts by weight) | 10.5 | 10 | 14 | 17 | 20 |
| (A-2) Second graft copolymer (parts by weight) | 10.5 | 10 | 7 | 8 | 10 |
| (B-1) First styrene-based copolymer (parts by weight) | 12 | 15 | 0 | 15 | 15 |
| (B-2) Second styrene-based copolymer (parts by weight) | 67 | 65 | 79 | 60 | 55 |

TABLE 4-continued

| Classification | Comparative Example 1 | Comparative Example 2 | Comparative Example 3 | Comparative Example 4 | Comparative Example 5 |
|---|---|---|---|---|---|
| (C) Inorganic pigment (parts by weight) | 0 | 0 | 0 | 0 | 0 |
| Weight ratio of first and second graft copolymers | 10:10 | 10:10 | 10:5 | about 10:47 | 10:5 |
| Melt flow Index | 12.1 | 12.2 | 11.5 | 11.2 | 10.2 |
| Hardness | 114.8 | 115.6 | 114.2 | 111.4 | 108.6 |
| Impact strength | 6.9 | 6.7 | 7.4 | 8.4 | 9.7 |
| Heat deflection temperature | 89.5 | 89.5 | 84.9 | 89.3 | 88.5 |
| Film appearance | X | X | X | Δ | Δ |
| Weather resistance (ΔE) | 4.5 | 4.5 | 5.3 | 4.3 | 4.0 |

(A-1) First graft copolymer: ASA graft copolymer (average particle diameter of butyl acrylate rubber polymer: 400 nm)
(A-2) Second graft copolymer: ASA graft copolymer (average particle diameter of butyl acrylate rubber polymer: 101 nm)
(B-1) First styrene-based copolymer: 98UHM commercially available from LG Chem Ltd. (α-methylstyrene/styrene/acrylonitrile copolymer, weight-average molecular weight: 100,000 g/mol)
(B-2) Second styrene-based copolymer: 97HC commercially available from LG Chem Ltd. (styrene/acrylonitrile copolymer, weight-average molecular weight: 170,000 g/mol)

TABLE 5

| Classification | Comparative Example 6 | Comparative Example 7 | Comparative Example 8 | Comparative Example 9 | Comparative Example 10 |
|---|---|---|---|---|---|
| (A-1) First graft copolymer (parts by weight) | 22 | 3 | 3 | 10.5 | 14 |
| (A-2) Second graft copolymer (parts by weight) | 11 | 35 | 35 | 10.5 | 7 |
| (B-1) First styrene-based copolymer (parts by weight) | 15 | 62 | 0 | 12 | 0 |
| (B-2) Second styrene-based copolymer (parts by weight) | 52 | 0 | 62 | 67 | 79 |
| (C) Inorganic pigment (parts by weight) | 0 | 0 | 0 | 3 | 3 |
| Weight ratio of first and second graft copolymers | 10:5 | about 1:11.7 | about 1:11.7 | 10:10 | 10:5 |
| Melt flow Index | 9.6 | 11.1 | 11.3 | 12.4 | 11.9 |
| Hardness | 106.5 | 101 | 101.7 | 115.2 | 114.6 |
| Impact strength | 10.6 | 5.6 | 4.8 | 6.4 | 7.0 |
| Heat deflection temperature | 88.3 | 93.2 | 85.8 | 89.7 | 85.3 |
| Film appearance | X | X | X | X | X |
| Weather resistance (ΔE) | 3.7 | 3.3 | 4.7 | 3.1 | 3.9 |

(A-1) First graft copolymer: ASA graft copolymer (average particle diameter of butyl acrylate rubber polymer: 400 nm)
(A-2) Second graft copolymer: ASA graft copolymer (average particle diameter of butyl acrylate rubber polymer: 101 nm)
(B-1) First styrene-based copolymer: 98UHM commercially available from LG Chem Ltd. (α-methylstyrene/styrene/acrylonitrile copolymer, weight-average molecular weight: 100,000 g/mol)
(B-2) Second styrene-based copolymer: 97HC commercially available from LG Chem Ltd. (styrene/acrylonitrile copolymer, weight-average molecular weight: 170,000 g/mol)

Referring to Tables 1 to 5, the thermoplastic resin compositions of Examples 1 to 6, which included a first graft copolymer in an amount larger than that of a second graft copolymer, exhibited excellent impact strength compared to the thermoplastic resin compositions of Comparative Examples 1 and 2 which included a first graft copolymer and a second graft copolymer in the same amounts, and realized appropriate levels of hardness and a heat deflection temperature. Accordingly, in the case of the thermoplastic resin compositions of Examples 1 to 6, hardness, impact resistance, and heat resistance were harmoniously achieved, and thus an excellent film appearance was exhibited. However, the thermoplastic resin compositions of Comparative Examples 1 and 2 were excellent in hardness and a heat deflection temperature but exhibited an impact strength of less than 7 kg·cm/cm, and thus hardness, impact resistance, and heat resistance were not harmoniously achieved, resulting in a substantially degraded film appearance.

The thermoplastic resin composition of Example 7, which included both a first styrene-based copolymer and a second styrene-based copolymer as non-grafted copolymers, exhibited excellent hardness, but the impact strength, heat deflection temperature, and weather resistance thereof were slightly degraded as compared to the thermoplastic resin composition of Example 8 which included only a first styrene-based copolymer as a non-grafted copolymer. However, all of hardness, impact strength, and a heat deflection temperature were maintained at appropriate levels and thus harmoniously achieved, resulting in an excellent film appearance.

Meanwhile, the thermoplastic resin composition of Example 8, which included only a first styrene-based copolymer as a non-grafted copolymer, exhibited slightly degraded hardness compared to the thermoplastic resin composition of Comparative Example 3 which included only a second styrene-based copolymer as a non-grafted copolymer, but all of hardness, impact strength, and a heat deflection temperature were maintained at appropriate levels. Accordingly, in the case of the thermoplastic resin composition of Example 8, hardness, impact resistance, and heat resistance were harmoniously achieved, resulting in an excellent film appearance. However, the thermoplastic resin composition of Comparative Example 3 was excellent in hardness and impact strength but exhibited a substantially degraded heat deflection temperature such as 84.9° C., and thus hardness, impact resistance, and heat resistance were not harmoniously achieved, resulting in a substantially degraded film appearance.

The thermoplastic resin compositions of Examples 9 and 10, in which the sum of first and second graft copolymers was 22 parts by weight, maintained appropriate levels of hardness, impact strength, and a heat deflection temperature. Accordingly, in the case of the thermoplastic resin compositions of Examples 9 and 10, hardness, impact resistance, and heat resistance were harmoniously achieved, resulting in an excellent film appearance.

The thermoplastic resin compositions of Comparative Examples 4 to 6, in which the sum of first and second graft copolymers was 25 parts by weight, 30 parts by weight, and 33 parts by weight, respectively, were excellent in impact strength and a heat deflection temperature but exhibited degraded hardness. Accordingly, hardness, impact resistance, and heat resistance were not harmoniously achieved, resulting in a degraded film appearance.

In addition, the thermoplastic resin composition of Comparative Example 7, which included a first graft copolymer in an amount smaller than that of a second graft copolymer, exhibited substantially degraded hardness and impact strength despite including a first styrene-based copolymer as a non-grafted copolymer. Accordingly, hardness, impact resistance, and heat resistance were not harmoniously achieved, resulting in a substantially degraded film appearance.

In addition, the thermoplastic resin composition of Comparative Example 8, which included a first graft copolymer in an amount smaller than that of a second graft copolymer, exhibited a substantially degraded heat deflection temperature compared to the thermoplastic resin composition of Comparative Example 7 due to including no first styrene-based copolymer as a non-grafted copolymer. Also, in the case of the thermoplastic resin composition of Comparative Example 8, like the thermoplastic resin composition of Comparative Example 7, hardness, impact resistance, and heat resistance were not harmoniously achieved, resulting in a substantially degraded film appearance.

Meanwhile, the thermoplastic resin compositions of Examples 11 and 12, which further included $TiO_2$ compared to the thermoplastic resin composition of Example 4, exhibited substantially improved weather resistance compared to the thermoplastic resin composition of Example 4, but the hardness, heat deflection temperature, and impact strength thereof were not greatly affected, and thus a film appearance was still excellent. The thermoplastic resin composition of Example 12, which included $TiO_2$ in an amount larger than that in the thermoplastic resin composition of Example 11, exhibited slightly degraded impact strength, but the weather resistance thereof was improved.

Meanwhile, the thermoplastic resin composition of Example 13, which further included $TiO_2$ compared to the thermoplastic resin composition of Example 8, exhibited substantially improved weather resistance compared to the thermoplastic resin composition of Example 8, but the hardness, heat deflection temperature, and impact strength thereof were not greatly affected, and thus a film appearance was still excellent. The thermoplastic resin composition of Comparative Example 9, which further included $TiO_2$ compared to the thermoplastic resin composition of Comparative Example 1, exhibited substantially improved weather resistance compared to the thermoplastic resin composition of Comparative Example 1, but the hardness, heat deflection temperature, and impact strength thereof were not greatly affected, and thus film appearance characteristics were still poor. In addition, the thermoplastic resin composition of Comparative Example 10, which further included $TiO_2$ compared to the thermoplastic resin composition of Comparative Example 3, exhibited substantially improved weather resistance compared to the thermoplastic resin composition of Comparative Example 3, but the hardness, heat deflection temperature, and impact strength thereof were not greatly affected, and thus film appearance characteristics were still poor.

The invention claimed is:

1. A thermoplastic resin composition comprising:
   a first graft copolymer including a first acrylic rubber polymer;
   a second graft copolymer including a second acrylic rubber polymer;
   a first styrene-based copolymer including an alkyl-substituted styrene-based monomer unit and an acrylonitrile-based monomer unit; and
   a second styrene-based copolymer including an alkyl-unsubstituted styrene-based monomer unit and an acrylonitrile-based monomer unit,
   wherein the first acrylic rubber polymer has an average particle diameter larger than that of the second acrylic rubber polymer,
   the first graft copolymer is included in a larger amount than the second graft copolymer,
   with respect to 100 parts by weight of the sum of the first graft copolymer, the second graft copolymer, the first styrene-based copolymer and the second styrene-based copolymer,
   the sum of the first graft copolymer and the second graft copolymer is 22 parts by weight or less,
   an amount of the first styrene-based copolymer is 5 to 30 parts by weight, and
   an amount of the second styrene-based copolymer is 50 to 80 parts by weight.

2. The thermoplastic resin composition of claim 1, wherein the sum of the first graft copolymer and the second graft copolymer is 21 parts by weight or less with respect to 100 parts by weight of the sum of the first graft copolymer, the second graft copolymer, the first styrene-based copolymer and the second styrene-based copolymer.

3. The thermoplastic resin composition of claim 1, wherein the sum of the first graft copolymer and the second graft copolymer is 15 to 22 parts by weight with respect to 100 parts by weight of the sum of the first graft copolymer, the second graft copolymer, and the first styrene-based copolymer and the second styrene-based copolymer.

4. The thermoplastic resin composition of claim 1, wherein the first graft copolymer and the second graft copolymer are in a weight ratio of 10:0.5 to 10:9.

5. The thermoplastic resin composition of claim 1, wherein the first acrylic rubber polymer has an average particle diameter of 250 to 500 nm.

6. The thermoplastic resin composition of claim 1, wherein the second acrylic rubber polymer has an average particle diameter of 30 to 200 nm.

7. The thermoplastic resin composition of claim 1, wherein the first graft copolymer includes a styrene-based monomer unit and an acrylonitrile-based monomer unit which are grafted onto the first acrylic rubber polymer, and
the second graft copolymer includes a styrene-based monomer unit and an acrylonitrile-based monomer unit which are grafted onto the second acrylic rubber polymer.

8. The thermoplastic resin composition of claim 1, wherein the first styrene-based copolymer is selected from the group consisting of an α-methylstyrene/acrylonitrile copolymer and an α-methylstyrene/styrene/acrylonitrile copolymer.

9. The thermoplastic resin composition of claim 1, wherein the second styrene-based copolymer is a styrene/acrylonitrile copolymer.

10. The thermoplastic resin composition of claim 1, further comprising an inorganic pigment.

11. The thermoplastic resin composition of claim 10, wherein, with respect to 100 parts by weight of the sum of the first graft copolymer, the second graft copolymer, the first styrene-based copolymer, and the second styrene-based copolymer, 0.5 to 18 parts by weight of the inorganic pigment is included.

12. The thermoplastic resin composition of claim 10, wherein the inorganic pigment is $TiO_2$.

* * * * *